(12) United States Patent
Forkan et al.

(10) Patent No.: US 7,913,444 B2
(45) Date of Patent: Mar. 29, 2011

(54) FISHING LURE WITH SAFETY FEATURES

(75) Inventors: Conor Forkan, Toronto (CA); J. Todd Anderson, Oakville (CA); Robert Glenn Schuyler, Toronto (CA)

(73) Assignee: Spin Master Ltd., Toronto, Ontario (CA)

( * ) Notice: Subject to any disclaimer, the term of this patent is extended or adjusted under 35 U.S.C. 154(b) by 594 days.

(21) Appl. No.: 12/075,259

(22) Filed: Mar. 10, 2008

(65) Prior Publication Data

US 2009/0223110 A1    Sep. 10, 2009

(51) Int. Cl.
*A01K 85/02*    (2006.01)

(52) U.S. Cl. ....... 43/42.43; 43/42.42; 43/43.2; 43/42.04

(58) Field of Classification Search .................. 43/42.4,
43/42.41, 42.42, 42.43, 42.36, 43.2, 43.4,
43/43.6, 41.2, 41, 42.1, 34–37, 42.04
See application file for complete search history.

(56) References Cited

U.S. PATENT DOCUMENTS

| | | | |
|---|---|---|---|
| 2,932,114 A * | 4/1960 | Meucci | 43/43.6 |
| 3,665,634 A | 5/1972 | Baud | |
| 3,849,928 A | 11/1974 | Collins, Sr. | |
| 4,228,610 A * | 10/1980 | Anderson | 43/42.41 |
| 5,388,367 A * | 2/1995 | Rydell | 43/43.2 |
| 6,574,907 B1 | 6/2003 | Mitton | |
| 2002/0124454 A1 * | 9/2002 | Jones | 43/42.4 |

* cited by examiner

*Primary Examiner* — Joshua J Michener

(74) *Attorney, Agent, or Firm* — Cohen Pontani Lieberman & Pavane LLP

(57) ABSTRACT

A fishing lure, generally the size and shape of a bait fish such as a minnow, is equipped with a safety feature, whereby the lure comprises a hook, preferably positioned on the under surface corresponding to the bait fish's belly, and a spring-biased shell, pivotally connected to the body and positioned such that the shell shields the hook completely when the shell is in a first position and the lure is out of the water, and exposes the hook when the shell is in a second position while the lure is in water, thereby permitting the lure to be used for fishing while preventing injuries from mishandling.

11 Claims, 3 Drawing Sheets

FISHING LURE WITH SAFETY FEATURES

BACKGROUND OF THE INVENTION

1. Field of the Invention

The present invention relates to fishing lures. Specifically it relates to fishing lures having safety features to protect the user from becoming injured by the fish hook when the fishing lure is not in use.

2. Description of Related Art

Fishing lures are well known in the art of fishing equipment. They either include, or are used in conjunction with, a fishing hook.

As fishing is an activity for people of all ages, it is inevitable that children will use fishing lures, and accordingly, injuries resulting from the mishandling of fish hooks are common. Ideally therefore, a fishing lure would have its hook exposed only when it is needed to catch fish, that is, when the fishing lure is in the water.

The fishing lure described herein solves this problem by providing a protective shell around the hook of the lure, whereby the protective shell is moved away from the hook by forces acting upon it either when the lure is thrown into the water, or dragged through the water, thereby exposing the hook. The applicants' fishing lure may be used with any conventional fishing equipment, but is particularly suited for use with the Rocket Fishing Rod™ as described in U.S. Pat. No. 6,880,286 to Wyman et al.

SUMMARY OF THE INVENTION

According to one aspect, there is provided a fishing lure for connection to a fishing line, the fishing lure comprising: a body having a front end and a back end; a fish hook fixedly connected to the body; a shell pivotally connected to the body, the shell pivotal between a first closed position shielding the fish hook and a second open position whereby the fish hook is exposed.

According to another aspect, there is provided a fishing lure for connection to a fishing line, the fishing lure comprising: a body having a front end and a back end; a fish hook, fixedly connected to the body; an eyelet fixedly connected to the body for threading the fishing line therethrough; a shell pivotally connected to the body, the fishing line connected to the shell, wherein the shell is pivotal between a first closed position where the shell covers the fishing hook, and a second open position where the fish hook is exposed; and a stop to maintain the shell in the second open position once the shell has reached the second position, wherein the shell is biased in the first position by a spring connected at one end to the shell and at the other end to the body, wherein the spring has a restoring force, and wherein the shell rotates from the first position to the second position when a force sufficient to overcome the restoring force of the spring is applied to the fishing line.

According to a further aspect, there is provided a fishing lure for connection to a fishing line, the fishing lure comprising: a body having a front end, a back end, and a cavity; a fish hook, pivotally connected to the body within the cavity, the fish hook being pivotal between a first position where the fish hook is hidden within the cavity, and a second position where the fish hook is exposed.

In other aspects, the fishing lure includes an eyelet connected to the body near the front end for receiving the fishing line therethrough and the eyelet may be formed within an enlarged lip with a forward facing concave surface. The shell may be connected to the fishing line at a point that is directly in line with the eyelet, such that when a force is applied to the fishing line in a direction toward the front end of the body, the shell pivots from the first closed position toward the second open position. The shell may be biased in the first position by a spring. The body may include a stop positioned and configured for holding the shell in the second position. Advantageously, the fishing lure may be sized and shaped to resemble a bait fish, and the shell may include a cavity for receiving a weighted member to assist in sinking the lure.

It is to be understood that other aspects of the present fishing lure will become readily apparent to those skilled in the art from the following detailed description, wherein various embodiments are shown and described by way of illustration. As will be realized, the fishing lure is capable for other and different embodiments and its several details are capable of modification in various other respects, all without departing from the spirit and scope of the fishing lure described. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the fishing lure are illustrated by way of example, and not by way of limitation, in detail in the figures, wherein.

DETAILED DESCRIPTION OF THE PRESENTLY PREFERRED EMBODIMENTS

The applicants' fishing lure with safety features will now be described with reference to specific embodiments, wherein similar numerals are used to identify similar elements.

Figure 1:
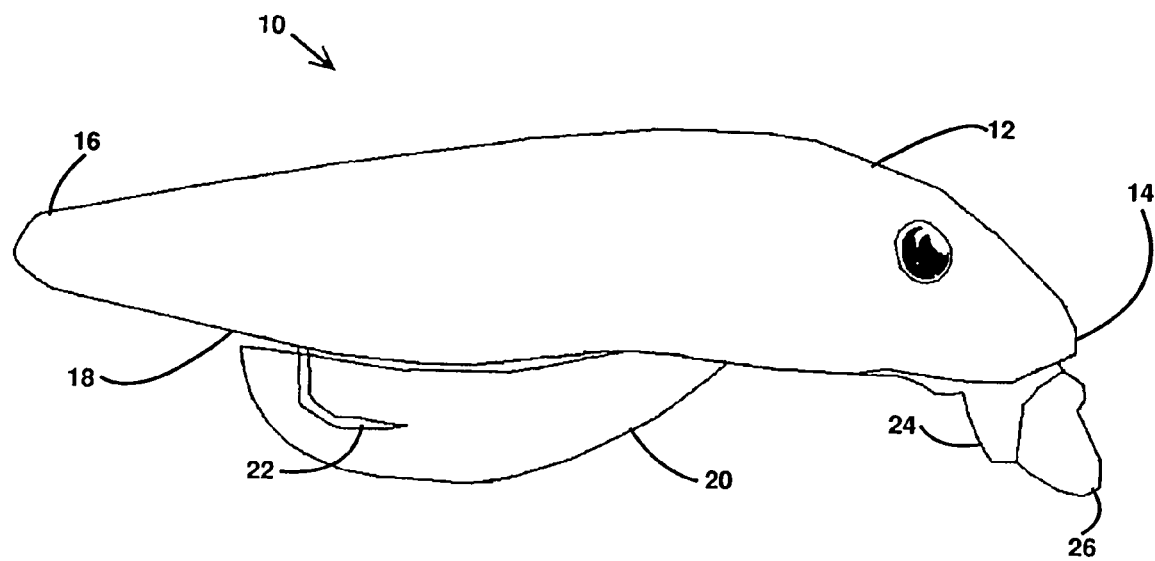
FIG. 1 shows a right-side view of one embodiment of the applicants' fishing lure with safety features as described herein, with the fish hook shielded.

Referring to FIG. 1, one embodiment of a fishing lure with safety features is shown. The fishing lure, generally indicated by numeral 10, comprises a body 12, having a front end 14, a back end 16 and a bottom surface 18. As is apparent from FIG. 1, the body 12 of the lure may be shaped to resemble that of a bait fish, such as a minnow, but the applicants' fishing lure should not be considered so limited, as other shapes and configurations are possible.

Mounted on the body 12 is a hook 22. In the embodiment shown, hook 22 is connected to the bottom surface 18 and is a single, forward-pointing hook, however, any other suitable fish hook configuration may be used and the presently described fishing lure should not be considered to be limited to the type of hook shown herein.

In FIG. 1, hook 22 is shown to be covered or shielded by a hollowed-out shell 20, which is pivotally connected to the body 12 at a shell pivot point (not shown) located inside body 12. Shell 20 is pivotal between a first rest position (shown in FIG. 1) wherein shell 20 shields hook 22 and a second open position (shown in FIG. 4) wherein hook 22 is exposed for fishing. In the embodiment shown in FIG. 1, shell 20 is shown to be transparent, so that while the hook 22 is hidden inside shell 20 in the sense that it is covered or shielded for safety, it remains visible from the outside. Shell 20 need not be transparent, but may be made from any suitable material.

At the front end 14, there is an eyelet frame 24 including a lip 26. An aperture or eyelet 28 (see FIGS. 2 and 3) is formed through both the frame 24 and the lip 26. Advantageously, lip 26 and eyelet 28 are positioned directly in front of shell 20. The reason for this positioning shall be apparent from the discussion below.

Figure 2:
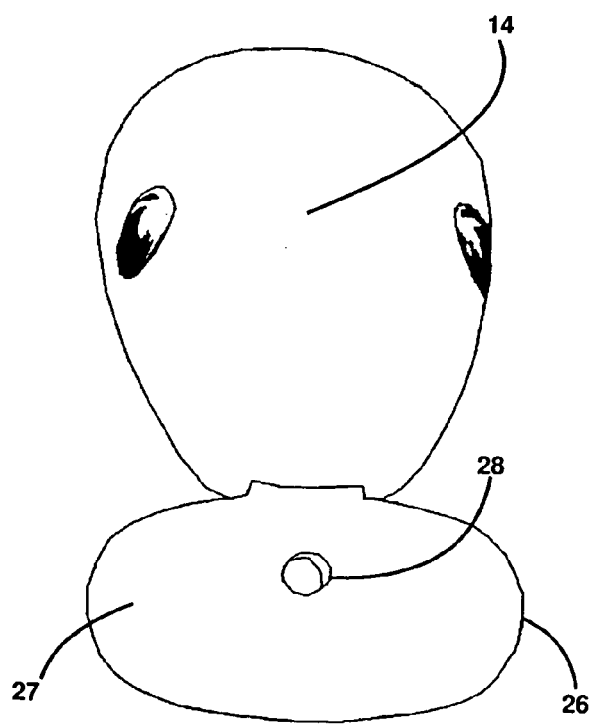
FIG. 2 shows a front view of the fishing lure shown in FIG. 1.

As best shown in FIG. 2, lip 26 faces forward toward the front end 14 and has an enlarged forward facing concave outer surface 27 that substantially extends the surface area of the front end 14 of the lure 10, thereby displacing more water as the lure is pulled through the water. Lip 26 also serves to create disturbances in the water flowing around the lure causing the lure to remain submerged, as well as imparting erratic movements to the lure thereby giving the lure the appearance of a real bait fish.

Figure 3:
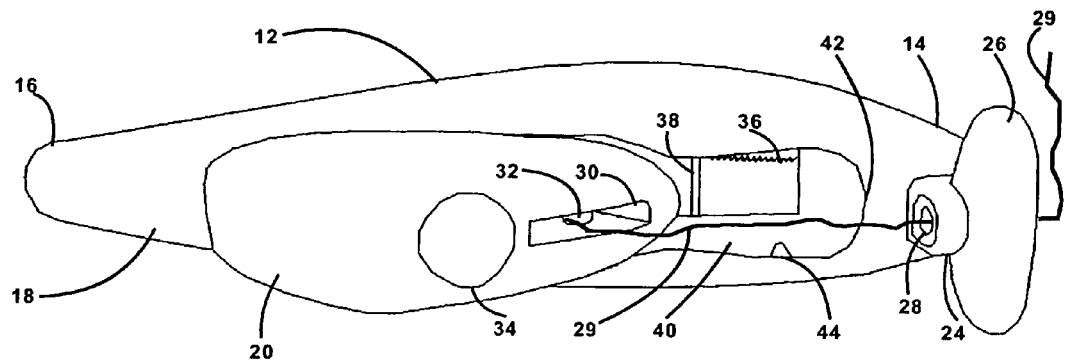
FIG. 3 shows a perspective view of the bottom side of the fishing lure shown in FIG. 1.

As shown in FIG. 3, aperture 28 is for threading a fishing line 29 therethrough to be secured on a peg 32 within a slot 30 of shell 20. This arrangement provides not only a practical means of securing a fishing line to the fishing lure 10, but also ensures that the shell 20 is properly pivoted forward in the direction of arrow A (see FIG. 4) when in the water to expose the hook 22.

The underside 18 of the fishing lure 10 has a cavity 40, through which shell 20 is pivotally connected to the body 12 at the shell pivot point (not shown) by a pair of arms with tongues and corresponding depressions (not shown) within the cavity 40. It will be understood by those skilled in the art that the pivot connection between shell 20 and body 12 may take different forms and the arrangement described herein is merely representative of one such form, and that the present fishing lure with safety features is not limited to the embodiment described herein.

Figure 4:
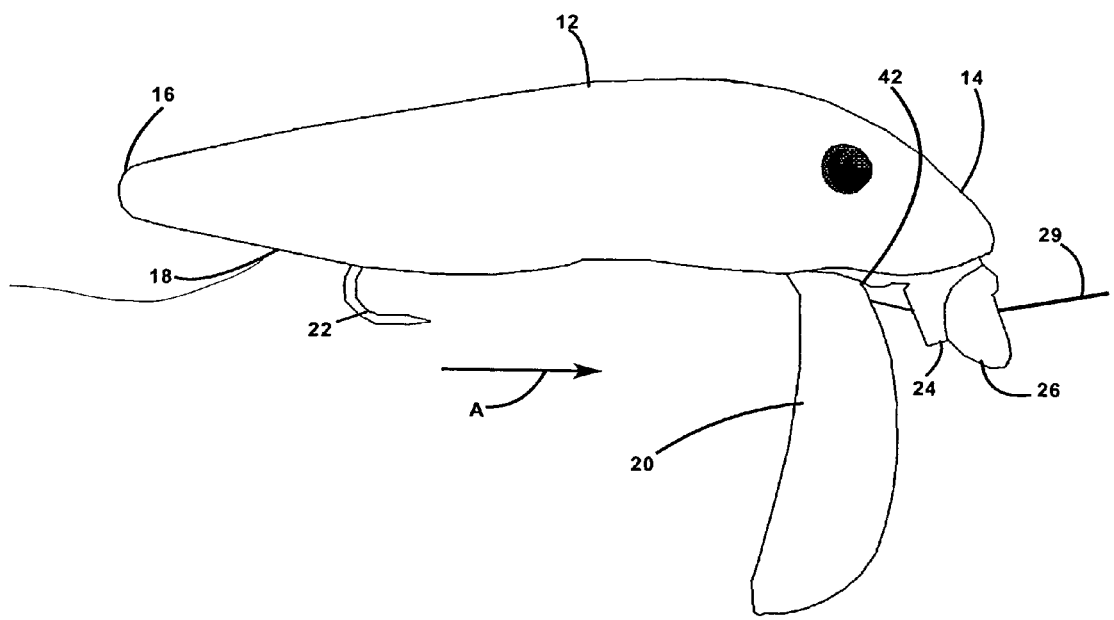
FIG. 4 shows a right-side view of the fishing lure shown in FIG. 1, with the fish hook exposed.

In the embodiment shown in FIG. 3, the pair of arms is further connected to a peg 38 running between the arms so that when shell 20 is rotated forward, counterclockwise in the direction of arrow A in FIG. 4, peg 38 moves towards the back end 16 of the fishing lure 10. Peg 38 is connected to one end of a spring 36, which is connected at its other end to a stationary element (not shown) within front end 14 of the lure.

Accordingly, the spring 36 exerts a restoring bias force on peg 38 in the direction of arrow A towards the front end 14 of the lure 10, which translates through the shell pivot point into a force acting on shell 20 in the opposite direction, causing shell 20 to pivot clockwise towards the back end 16 of the lure, thereby covering or shielding the hook 22. Therefore, to cause shell 20 to pivot in the direction of arrow A, exposing the hook 22, requires a force at least equal to the restoring force exerted by spring 36.

The restoring force exerted by spring 36 is relatively small in absolute terms, but what is important for the purpose of the present fishing lure 10 is that once the lure is in the water and the hook 22 needs to be exposed for fishing, the force exerted by the fishing line on peg 32 needs to be greater than the restoring force of spring 36 on peg 38. This can occur in any number of ways, for example when the lure is cast with sufficient force, or if the lure is cast with a limited amount of line, as the line is fully extended, or when trolled through the water with sufficient speed so as to create enough drag, or simply by giving the line a strong enough jerk while the lure is in the water. Importantly, the position of the eyelet 28 directly in line with peg 32 makes the opening of the shell 20 more likely, as it directs the fishing line 29 in the proper direction for applying a force, which will overcome the force exerted by spring 36. Furthermore, the lip 26 is enlarged in such a manner as to increase the drag of the lure 10 when in the water, thereby further increasing the likelihood that the shell 20 will be opened while in the water.

If the fishing line 29 is pulled with sufficient force, the shell 20 rotates counterclockwise in the direction of arrow A until it reaches a forward edge 42 of cavity 40. Once shell 20 reaches this position, it is held in place by a one-way shell stop 44, which is made of resilient plastic or other suitable material, extending or protruding horizontally into cavity 40. Stop 44 is positioned and shaped in such a manner that it permits shell 20 to move forward over stop 44 in the direction of arrow A towards the front end 14 of the lure, but does not permit shell 20 to move back towards the rear end 16 of the lure merely under the restoring force of spring 36. Therefore, once the shell 20 is fully opened, it remains held opened by shell stop 44 until a force is applied to shell 20 in a direction opposite arrow A sufficient to move shell 20 back over the stop 44. At this point, the restoring force exerted by spring 36, returns the shell 20 to its safety rest position, covering hook 22.

Also shown in FIG. 3, the shell 20 may be equipped with a cavity 34, for placing a weighted member therein, as is common in lures of this type to assist the lure in sinking below the surface of the water.

FIG. 4 shows the fishing lure of the present invention having its shell opened and maintained in place by stop 44.

In operation, one end of the fishing line 29 is inserted through eyelet 28 and secured to protective shell 20 via peg 32, or by some other suitable means. The fishing lure 10 is then cast or thrown into the water and pulled through the water in the normal manner. The act of casting the fishing lure into the water, or the force of the water acting against the fishing lure, and in particular against the lip 26, results in sufficient force being exerted on shell 20 in the direction of arrow A to cause shell 20 to overcome the restorative force of spring 36 and move from the closed position (see FIG. 1) covering hook 22 to the open position (see FIG. 4), where hook 22 is exposed. Once shell 20 pivots to a forward position against the forward edge 42 of cavity 40, the one-way shell stop 44 holds the shell in the open position against the restorative force of spring 36. To return shell 20 to the closed position, shielding the hook, a force directed opposite to arrow A and sufficient to overcome the stop 44 is applied to the shell 20. Once the shell 20 is moved back over stop 44 the restoring force exerted by spring 36 takes over to return the shell to its safety rest position, shielding hook 22.

Figure 5:
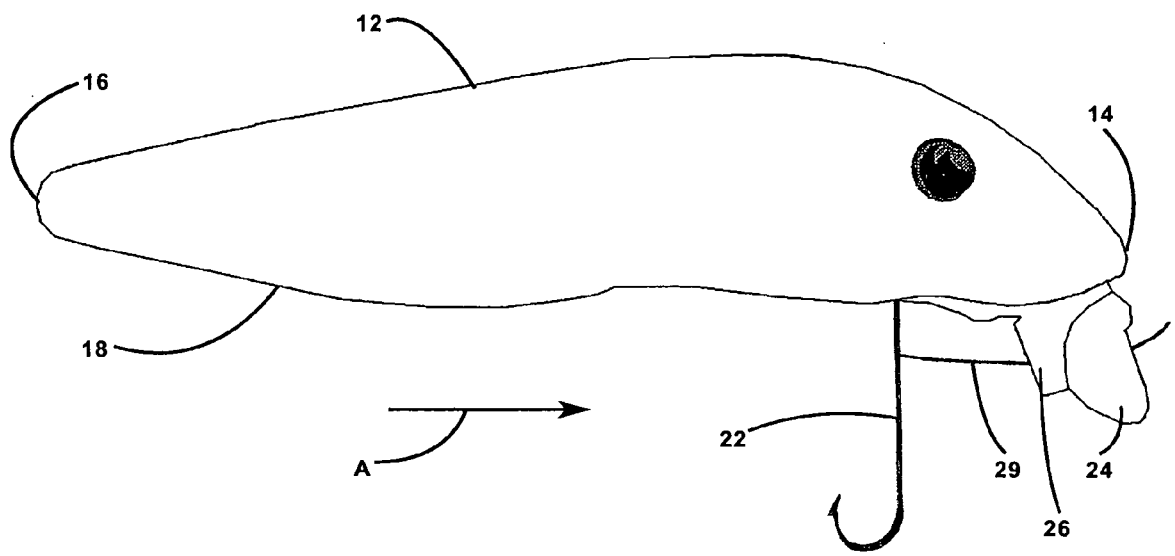
FIG. 5 shows another embodiment of the applicants' fishing lure with safety features, with the fish hook exposed.

A further embodiment of the applicants' fishing lure with safety features is shown in FIG. 5, wherein the shield 20 has be eliminated. Instead, the hook 22 may be pivotally connected to the underside 18 of body 12 in a similar manner as described above for shield 20. In this embodiment, hook 22 is connected to the fishing line 29 and is normally retained in a first position (not shown), recessed within cavity 40, where hook 22 is protected from exposure during handling of the fishing lure. When sufficient force is exerted on fishing line 29 by casting the lure into the water, or pulling the lure through the water, the hook 22 is pivoted in the direction of arrow A into a second position (as shown in FIG. 5) where the hook 22 is exposed for fishing. In this embodiment, hook 22 may be locked into the second position by a stop, similar to stop 44 on body 12 used to retain shield 20 in the open second position. The fish hook 22 may be connected to the fishing line 29 through eyelet 28 in a manner as previously described, so that when a force is applied to the fishing line in a direction A toward the front end 14 of the body, the fish hook 22 pivots from the first protected position within the cavity 40 toward the second position (shown in FIG. 5) where the hook is exposed for fishing. The fish hook may be biased in the first position by a spring connected to fish hook 22 in a manner similar to the connection of spring 36 used to bias shield 20 in the closed first position.

The previous detailed description is provided to enable any person skilled in the art to make or use the present fishing lure with safety features. Various modifications to those embodiments will be readily apparent to those skilled in the art, and the generic principles defined herein may be applied to other embodiments without departing from the spirit or scope of the fishing lure described herein. Thus, the present fishing lure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A fishing lure for connection to a fishing line, the fishing lure comprising:
    a body having a front end and a back end;
    a fish hook fixedly connected to said body;
    a shell pivotally connected to said body, said shell pivotal between a first closed position shielding said fish hook and a second open position whereby said fish hook is exposed; and
    wherein said body further comprises a stop, said stop positioned and configured for holding said shell in said second position.

2. The fishing lure of claim 1, further including an eyelet, fixedly connected to said body near said front end, said eyelet for receiving the fishing line therethrough.

3. The fishing lure of claim 1, wherein said shell includes a means for connecting the fishing line thereto such that when a force is applied to the fishing line in a direction toward said front end of the body, said shell pivots from said first closed position toward said second open position.

4. The fishing lure of claim 1, wherein said shell is biased in said first position by a biasing means.

5. The fishing lure of claim 4, wherein said biasing means is a spring connected at one end to the body and at the other end to said shell, said spring exerting a spring force on said shell to bias said shell toward said first closed position.

6. The fishing lure of claim 1, wherein said body is sized and shaped to resemble a bait fish.

7. The fishing lure of claim 1, wherein said shell comprises a cavity for receiving a weighted member.

8. The fishing lure of claim 2, wherein said eyelet is formed within an enlarged lip, said enlarged lip comprising a forward facing surface.

9. The fishing lure of claim 8, wherein said surface of said enlarged lip is concave.

10. The fishing lure of claim 2, wherein said shell includes a means for connecting the fishing line thereto, wherein said eyelet is located directly in front of and in line with said means for connecting the fishing line to said shell.

11. A fishing lure for connection to a fishing line, the fishing lure comprising:
    a body having a front end and a back end;
    a fish hook, fixedly connected to said body;
    an eyelet fixedly connected to said body for threading the fishing line therethrough;
    a shell pivotally connected to said body, said fishing line connected to said shell, wherein said shell is pivotal between a first closed position where the shell covers said fishing hook, and a second open position where the fish hook is exposed; and
    a stop to maintain said shell in said second open position once said shell has reached said second position,
    wherein said shell is biased in said first position by a spring connected at one end to said shell and at the other end to said body, wherein said spring has a restoring force,
    and wherein said shell rotates from said first position to said second position when a force sufficient to overcome said restoring force of said spring is applied to the fishing line.

* * * * *